US005578489A

United States Patent [19]

Petersen

[11] Patent Number: 5,578,489

[45] Date of Patent: Nov. 26, 1996

[54] REMOVAL OF HYDROPHOBIC ESTERS FROM TEXTILES

[75] Inventor: Gitte Petersen, Frederiksberg, Denmark

[73] Assignee: Novo Nordisk A/S, Bagsvaerd, Denmark

[21] Appl. No.: 244,571

[22] PCT Filed: Nov. 24, 1992

[86] PCT No.: PCT/DK92/00347

§ 371 Date: Jun. 1, 1994

§ 102(e) Date: Jun. 1, 1994

[87] PCT Pub. No.: WO93/13256

PCT Pub. Date: Jul. 8, 1993

[51] Int. Cl.$^6$ .................................................... C12S 11/00

[52] U.S. Cl. .......................... 435/263; 435/264; 435/198; 510/303; 510/321

[58] Field of Search .................................... 435/263, 264, 435/198; 252/174.12

[56] References Cited

U.S. PATENT DOCUMENTS

| | | | |
|---|---|---|---|
| 3,950,277 | 4/1976 | Stewart et al. | 252/541 |
| 4,810,414 | 3/1989 | Huge-Jensen et al. | 252/174.12 |
| 5,069,810 | 12/1991 | Holmes et al. | 252/174.12 |
| 5,223,169 | 6/1993 | El-Sayed et al. | 252/174.12 |

FOREIGN PATENT DOCUMENTS

| | | | |
|---|---|---|---|
| 0258068 | 3/1988 | European Pat. Off. | 3/386 |
| 1442418 | 7/1976 | United Kingdom | 1/16 |
| 1442419 | 7/1976 | United Kingdom | 1/16 |

*Primary Examiner*—Jeanette Hunter
*Attorney, Agent, or Firm*—Steve T. Zelson, Esq.; Cheryl H. Agris, Esq.

[57] ABSTRACT

Removal of hydrophobic esters from fabric comprises the sequential steps of: 1) impregnating the fabric with an aqueous solution of lipase to a liquor pick-up ratio of 50–200%; 2) incubating the impregnated fabric at 15°–70° C. for 1–24 hours; and 3) washing and rinsing to remove fatty acids.

15 Claims, No Drawings

REMOVAL OF HYDROPHOBIC ESTERS FROM TEXTILES

TECHNICAL FIELD

This invention relates to a process for removing hydrophobic esters from fabric in the textile industry.

BACKGROUND ART

It is in many cases required to remove fatty matter containing hydrophobic esters (especially triglycerides) during the finishing of textiles. Thus, most natural fibres contain some triglyceride in the form of oil, fat or wax that must be removed to obtain good water absorbency properties in the finished textile. Also, oil is in some cases added to textile to act as a lubricant during processing and must later be removed.

Fatty matter is commonly removed from textile by so-called caustic scouring, where the textile is treated with high amounts of alkali and wetting agent and held at a high pH and temperature (usually about 100° C. ).

It is well known to add a lipase to detergent to improve the removal of oily stains from soiled garments (e.g. U.S. Pat. No. 4,810,414). However, D. Aaslyng et al.: Mechanistic Studies of Proteases and Lipases for the Detergent Industry, presented at SCI, Recent Advances in the Detergent Industry, 26–28 Mar. 1990, University of Cambridge, England states that only very little effect of the enzyme is seen after the first wash, and that more than one wash cycle (each consisting of washing, rinsing and drying) is typically required to obtain pronounced effects with lipases.

Such an additional drying step is considered economically prohibitive for textile processing, and the use of lipases for removal of fatty material in the textile industry did therefore not seem economically practicable.

It is the object of this invention to provide an improved method of removing fatty material during textile processing.

STATEMENT OF THE INVENTION

We have developed a process whereby hydrophobic esters are effectively removed from fabric by use of lipase without the need for an expensive intermediate drying step. The process can be practised batch-wise or continuously using equipment commonly used in the textile industry, and it avoids the need for high pH and temperature in conventional caustic scouring.

Accordingly, the invention provides a process for removing hydrophobic esters from fabric, characterized by comprising the sequential steps of:

1) impregnating the fabric with an aqueous solution of lipase to a liquor pick-up ratio of 50–200%, 2) incubating the impregnated fabric at 15°–70° C. for 1–24 hours, and 3) washing and rinsing to remove fatty acids

DETAILED DESCRIPTION OF THE INVENTION

Fabric

The process of the invention can be applied to any fabric containing hydrophobic esters (e.g. triglycerides or ester coatings) that need to be removed from the finished textile. Examples are natural fibers with a residual content of naturally occurring triglycerides, e.g. native cotton (typically containing 0.5–1.0% of oils and waxes) and flax (linen) and wool. The process can also be used to remove oil or ester coatings that has been added during processing e.g. to make the fabric softer and smoother.

Step 1: Lipase impregnation

Lipases of plant or animal origin (e.g. pancreas lipase) can be used in the invention, but microbial lipases are preferred for reasons of economy. Lipases already known to be active in detergents can be used in the invention, but since the conditions of the process can be adapted to the lipase, many other lipases can also be used.

Examples are lipases derived from the following microorganisms. The indicated patent publications are incorporated herein by reference:

Humicola, e.g. *H. brevispora, H. lanuginosa, H. brevis* var. *thermoidea* and *H. insolens* (U.S. Pat. No. 4,810,414)

Pseudomonas, e.g. *Ps. fragi, Ps. stutzeri, Ps. cepacia* and *Ps. fluorescens* (WO 89/04361), Fusarium, e.g. *F. oxysporum* (EP 130,064).

Mucor (also called Rhizomucor), e.g. *M. miehei.*

Chromobacterium (especially *C. viscosum*)

Aspergillus (especially *A. niger*).

Candida, e.g. *C. cylindracea* (also called *C. rugosa*) or *C. antarctica* (WO 88/02775).

An example of a commercial lipase is Lipolase® (product of Novo Nordisk A/S).

The lipase activity present in the impregnation solution is preferably 100–10,000 KLU/g (KLU unit for lipase activity defined in U.S. Pat. No. 5,078,898). A buffer may be added to the impregnation to maintain a suitable pH for the lipase used. For Humicola lipase, a pH of 7–10 is suitable.

A conventional wetting agent may be used to improve contact between ester substrate and the lipase solution. The wetting agent may be a nonionic surfactant, e.g. an ethoxylated fatty alcohol. An example is the Berol Wash (product of Berol Nobel AB, Sweden), a linear primary $C_{16}$–$C_{18}$ fatty alcohol with an average of 12 ethoxylate groups. The wetting agent may be added to the lipase impregnation bath, or it may be used in a separate step prior to the lipase impregnation.

After immersing the fabric in the impregnation bath, it will usually be squeezed between rollers (mangled) to reach the liquor pick-up ratio (i.e. liquid:fabric weight ratio) of 50–200%, preferably 70–150%.

Step 2: Incubation

The process of the invention may be carried out continuously or batch-wise, using equipment commonly used in the textile industry. Thus, the incubation step can be made e.g. on a pad roll or jigger (batch-wise) or in a J box (continuous).

Steps 3: Washing and rinsing

Conventional washing may be used to remove the hydrolysis products, i.e. fatty acid, mono- and diglycerides and glycerol. Removal of fatty acid generally requires use of a nonionic or anionic surfactant and alkali at pH 8–12.

Conventional rinsing may be used, e.g. repeated rinsing with water. Cationic softener may be added to the last rinse step.

Combination with other process steps

In addition to the removal of fatty material according to this invention, the finishing of cotton will in many cases also involve desizing with an α-amylase to remove starch-containing size and/or bleaching with hydrogen peroxide. These can be carried out as separate steps before or after the fat removal, but advantageously one or both of these can be combined with the fat removal, so that α-amylase and/or hydrogen peroxide is added to the lipase solution used for impregnation.

Conventional bacterial α-amylase can used for the desizing, e.g. from Bacillus, especially *B. licheniformis, B. amyloliquefaciens* or *B. stearothermophilus*. Examples of commercial α-amylase products are Termamyl®, Aquazym® Ultra and Aquazym® (products of Novo Nordisk A/S). For desizing, typically the impregnation bath will have pH 5–8 and will contain an α-amylase activity of 100–10,000 KNU/l (1 KNU amylase unit=1000 NU, see EP 252,730) and 1–10 mM of $Ca^{++}$ as a stabilizer.

For bleaching, the impregnation bath will typically contain $H_2O_2$ at a concentration of 1–30 g/l at pH 8.5–11. The impregnation bath will typically also contain hydrogen peroxide stabilizers, e.g. sodium silicate and/or organic stabilizers, and a wetting agent/surfactant. The bleaching may be combined with desizing by applying an amylase to the impregnation bath.

EXAMPLE 1

Textile swatches containing fat with a dyestuff as an indicator for fat removal were prepared as follows: Bleached cotton (NT 2116 from Nordisk Tekstil) was cut into pieces of 5×5 cm. 0.075% (w/w) of Sudan red was added to lard at 70° C.; the mixture was kept at 5° C. and heated up to about 70° C. before use. 50 µl of the lard/Sudan red was applied to the centre of each swatch. The swatches were incubated at 70° C. for 30 minutes and kept overnight prior to the experiment. Two swatches were used for each experiment.

Test swatches prepared as above were treated by a process according to the invention as follows:

1) Prewash

| | |
|---|---|
| Wetting agent | 1 g/l ethoxylated fatty alcohol (Berol Wash) |
| Temperature: | 25, 40 or 70° C., as indicated below |
| Time: | 10 seconds |
| Immersions: | 3 |
| Mangling: | hard |

2) Impregnation

| | |
|---|---|
| Lipase: | Lipolase ®, 1 or 10 g/l, as indicated below |
| Buffer: | 0.1 M citric acid + 0.2 M phosphate |
| pH: | 7 or 9.5, as indicated below |
| Temperature: | as step 1) |
| Time: | 10 seconds |
| Immersions: | 3 |
| Mangling: | hard, liquor pick-up = 100% |

3) Incubation

| In small plastic bags | |
|---|---|
| Temperature: | as step 1) |
| Time: | 1, 4 or 24 hours, as indicated below |

4) Afterwash

| | |
|---|---|
| Wetting agent: | 1 g/l ethoxylated fatty alcohol (Berol Wash) |
| NaOH: | 1 g/l |
| Temperature: | 40° C. |
| Time: | 10 seconds |
| Immersions: | 3 |
| Mangling: | Hard |

5) Rinse

| | |
|---|---|
| Temperature: | 25° C. |
| Time: | 10 seconds |
| Immersions: | 3 |
| Mangling: | hard |

The swatches were evaluated by measuring the remission (whiteness) on one side on an Elrepho reflectometer at 460 nm. Higher whiteness is taken as an indication of higher fat removal since the sudan red is associated to the lard.

A reference experiment without lipase was made at each set of conditions. The results shown below are given as remission value R for the reference experiments without lipase, and for the experiments with lipase the increase in remission value ΔR over the reference is given:

| °C. | hours | pH | R reference | ΔR 1 g/l | ΔR 10 g/l |
|---|---|---|---|---|---|
| 25 | 24 | 7 | 45.78 | 1.11 | 17.97 |
| 25 | 24 | 9.5 | 45.92 | 0.16 | 18.71 |
| 40 | 4 | 7 | 46.82 | 0.66 | 3.98 |
| 40 | 4 | 9.5 | 47.35 | 0.20 | 0.75 |
| 70 | 1 | 7 | 52.72 | 0.64 | 0.38 |
| 70 | 1 | 9.5 | 52.17 | 1.30 | 0.47 |

The above results at pH 7.0 are shown in FIG. 1. It is seen that the most effective removal of fat is obtained at 25° C. and 24 hours at a high lipase dosage.

EXAMPLE 2

Combined fat removal and desizing

100% starch-sized cotton (NT 2116 from Nordisk Tekstil) was treated in the same manner as in Example 1, except that the impregnation bath had pH 7 and additionally contained 0.4 g/l of $CaCl_2$ $2H_2O$ and 5 g/l of bacterial α-amylase (Aquazyme Ultra 100L), incubation was 22 hours at 25° C., and afterwash was at 90° C.

Wettability of the treated fabric was measured as the time it takes for one drop of water on the fabric to be absorbed. The fat content of the fabric was measured by Soxtec extraction. Untreated fabric had 0.60% fat by this method. Results:

| Dosage of Lipolase 100 L | Wettability seconds | Fat content |
|---|---|---|
| 0 (reference) | 31 | 0.1–0.2% |
| 1 g/l | 21 | 0.1% |
| 10 g/l | 1 | <0.1% |

EXAMPLE 3

An experiment was conducted as follows. Other condition were as in Example 2.

Impregnation Composition of impregnation bath:

| | |
|---|---|
| $CaCl_2.2H_2O$ | 0.4 g/l |
| NaCl | 0 or 5 g/l |
| $H_2O_2$ 35% | 43 g/l |
| Stabilizer | 1 g/l Lastabil TGS (organic stabilizer from Hoechst) |
| NaOH | to pH 10.0 |
| Termamyl ® 120 L | 2 g/l |
| Lipolase ® 100 L | 1 g/l |
| Temperature and time | 24 hours at 25° C. or 5 hours at 40° C. |

Wettability of the treated fabric was measured as the time it takes for one drop of water on the fabric to be absorbed. The fat content of the fabric was measured by Soxtec extraction. Untreated fabric had 0.60% fat by this method. Results (wettability in minutes):

| Dosage of Lipolase 100 L | 25° C. | 25° C. + 5 g/l NaCl | 40° C. | 40 + 5 g/l NaCl |
|---|---|---|---|---|
| 0 (reference) | 10 | 10 | 10 | 10 |
| 1 g/l | 12 | 2 | 2.5 | 7 |

I claim:

1. A process for removing hydrophobic esters from fabric, comprising:

(1) impregnating the fabric with an aqueous solution of lipase in an amount effective to hydrolyze said esters to fatty acids to a liquor pick-up ratio of 50–200%, (2) incubating the impregnated fabric at 15°–70° C. for 1–24 hours as suitable for said lipase to hydrolyze said esters, and (3) washing and rinsing to remove the fatty acids.

2. The process according to claim 1, wherein the solution of step (1) contains 100–10,000 KLU/l of lipase activity.

3. The process according to claim 1, wherein the lipase is derived from a species of Humicola or Pseudomonas.

4. The process according to claim 1, wherein the lipase is derived from *Humicola insolens* or *P. cepacia.*

5. The process according to claim 1, wherein the lipase solution of step (1) has pH 6–10.

6. The process according to claim 1, wherein the pick-up ratio in step (1) is 70–150%.

7. The process according to claim 1, wherein the fabric is a cotton fabric.

8. The process according to claim 7, wherein the fabric contains starch-containing size and the solution of step (1) contains an alph-amylase in an amount effective to remove the starch-containing size.

9. The process according to claim 7, wherein the solution of step (1) contains hydrogen peroxide in an amount effective to bleach said fabric.

10. The process according to claim 1, wherein the incution of step (2) is conducted at 20°–40° C. for 4–24 hours.

11. The process according to claim 1, wherein the fabric is treated with a wetting agent prior to step (1).

12. The process according to claim 1, wherein the fabric is treated with an ethoxylated fatty alchohol at a concentration of 0.2–5 g/l prior to step (1).

13. The process according to claim 1, wherein the lipase solution of step (1) further comprises a wettable agent.

14. The process according to claim 1, wherein the lipase solution of step (1) further comprises an ethoxylated fatty alchohol at a concentration of 0.2–5 g/l.

15. The process according to claim 1, wherein step (3) comprises whashing at pH 8–12 with a wash solution containing anionic or nonionic surfactant followed by rinsing at least one time.

* * * * *